A. NELSON.
CUSHION TIRE.
APPLICATION FILED JUNE 7, 1915.
1,156,802.
Patented Oct. 12, 1915.
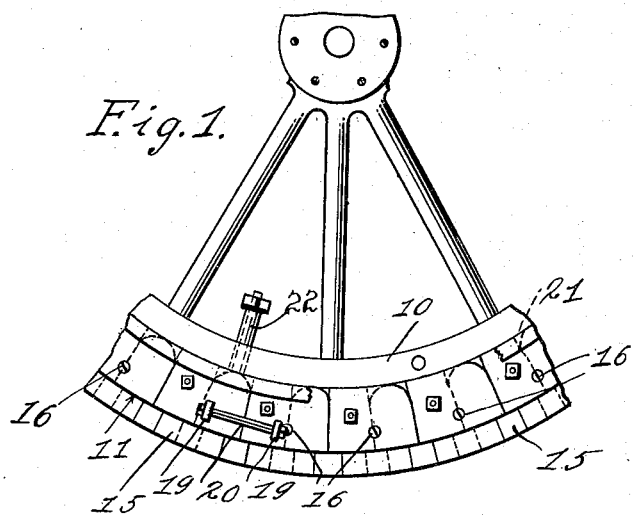
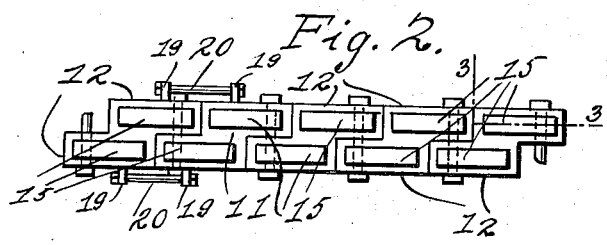
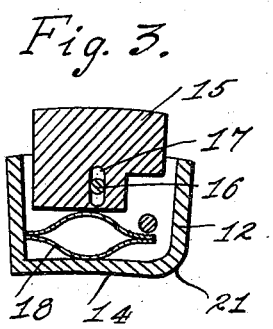
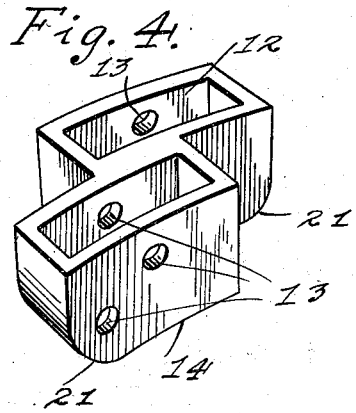
Inventor
A. Nelson.

UNITED STATES PATENT OFFICE.

ALFRED NELSON, OF CAMDEN, NEW JERSEY.

CUSHION-TIRE.

1,156,802.  Specification of Letters Patent.  Patented Oct. 12, 1915.

Application filed June 7, 1915. Serial No. 32,672.

*To all whom it may concern:*

Be it known that I, ALFRED NELSON, a citizen of the United States, residing at Camden, in the county of Camden, State of New Jersey, have invented certain new and useful Improvements in Cushion-Tires; and I do hereby declare the following to be a full, clear, and exact description of the invention, such as will enable others skilled in the art to which it appertains to make and use the same.

This invention relates to improvements in tires and particularly to cushion tires.

The principal object of the invention is to provide a novel device of this character which can be quickly and easily applied to or detached from the rim of an automobile or other vehicle wheel.

Another object is to provide a tire which is flexible in its nature so that it can be readily placed around the rim of a wheel and the ends thereof clamped together.

Another object is to provide a tire formed of a plurality of pivotally connected sections each of which carries yieldable ground engaging members whereby the resilient effect of a pneumatic tire is obtained.

Other objects and advantages will be apparent from the following description when taken in connection with the accompanying drawing.

In the drawing: Figure 1 is a side elevation of my improved tire on a wheel, Fig. 2 is a plan view of a section of the tire removed, Fig. 3 is a section on the line 3—3 of Fig. 2, and Fig. 4 is a perspective view of one of the sections of the tire.

Referring particularly to the accompanying drawing, 10 represents the rim of the wheel on which the tire is adapted to be clamped.

The tire comprises a plurality of sections 11, each of which includes a pair of longitudinally offset hollow blocks 12, the side walls of which are formed with the transverse openings 13. The bottom of each of the sections, that is the face which engages the wheel rim is curved longitudinally to conform to the curvature of the rim, as shown at 14. Disposed in each of the blocks 12 of each section 11 is a block 15, a portion of which projects outwardly through the open side of the block, while the portion within the block has a bolt 16 passed through the said portion and through certain of the openings 13. The opening in the block 15 through which the bolt 16 passes is elongated, as shown at 17. In each of the blocks 12, beneath the bottom of the blocks 15 are placed springs 18 which yieldably support the blocks 15 when said blocks contact with the road.

The sections are placed in the manner indicated in Fig. 2, so that they interlock and the blocks 12 of the end sections of the tire are provided with apertured lugs 19 through which are received bolts 20 for drawing the ends of the tire together to firmly clamp the same around the rim. The bottoms of the blocks, at the ends thereof are rounded, as shown at 21 so that they may have free rocking movement on the bolts 16 to facilitate the manipulation of the tire in drawing the same around the rim.

To adapt the tire for the ordinary rim of an automobile wheel, the tire is provided with one or more stems 22 which pass through the valve openings of the rim. These stems also prevent creeping of the tire on the rim.

What is claimed is:

A tire comprising a plurality of pivotally connected sections, each including a pair of offset hollow blocks, resiliently supported ground engaging blocks disposed in the hollow blocks, and means for detachably clamping the ends of the tire together around the rim of the wheel.

In testimony whereof, I affix my signature, in the presence of two witnesses.

ALFRED NELSON.

Witnesses:
 GEORGE A. BOYER,
 JOHN BERNSON.

Copies of this patent may be obtained for five cents each, by addressing the "Commissioner of Patents, Washington, D. C."